(12) United States Patent
Puddle et al.

(10) Patent No.: US 10,342,020 B2
(45) Date of Patent: Jul. 2, 2019

(54) RESPONDING TO PAGING REQUESTS WHILE WAITING TO REQUEST A CONNECTION TO A WIRELESS NETWORK

(71) Applicant: Alcatel Lucent, Boulogne Billancourt (FR)

(72) Inventors: Nicola Puddle, Swindon (GB); Graham Brend, Swindon (GB); Seau Sian Lim, Swindon (GB); Sudeep Kumar Palat, Swindon (GB)

(73) Assignee: Alcatel Lucent, Nozay (FR)

( * ) Notice: Subject to any disclaimer, the term of this patent is extended or adjusted under 35 U.S.C. 154(b) by 176 days.

(21) Appl. No.: 15/032,484

(22) PCT Filed: Sep. 26, 2014

(86) PCT No.: PCT/EP2014/002634
§ 371 (c)(1),
(2) Date: Apr. 27, 2016

(87) PCT Pub. No.: WO2015/062692
PCT Pub. Date: May 7, 2015

(65) Prior Publication Data
US 2016/0262159 A1    Sep. 8, 2016

(30) Foreign Application Priority Data
Oct. 31, 2013    (EP) .................................... 13306488

(51) Int. Cl.
*H04W 72/04*    (2009.01)
*H04W 4/70*    (2018.01)
(Continued)

(52) U.S. Cl.
CPC ........ *H04W 72/0486* (2013.01); *H04H 20/38* (2013.01); *H04W 4/70* (2018.02);
(Continued)

(58) Field of Classification Search
CPC ............. H04W 72/0486; H04W 4/005; H04W 68/005; H04W 68/02; H04W 76/046; H04H 20/38
See application file for complete search history.

(56) References Cited

U.S. PATENT DOCUMENTS 8,861,439 B2    10/2014    Ou et al.
8,913,589 B2 *  12/2014    Zhang ..................... H04W 4/70
                                                          370/331
(Continued)

FOREIGN PATENT DOCUMENTS

CN    102711250    10/2012
GB    2 448 367 A   10/2008
(Continued)

OTHER PUBLICATIONS

Ericsson, ST-Ericsson, Paging for priority services, 3GPP TSG-RAN WG2#70bis R2-103895, 3GPP, Jun. 22, 2010.
(Continued)

*Primary Examiner* — Chi H Pham
*Assistant Examiner* — Weibin Huang
(74) *Attorney, Agent, or Firm* — Fay Sharpe LLP

(57) ABSTRACT

A user equipment, radio control node, method and computer program are disclosed. The user equipment is configured to communicate with other devices across a wireless communication network comprising a plurality of radio coverage cells, the user equipment being configured to respond to receipt of a message from the network, the message comprising a wait time, to not transmit a connection request until after expiry of the wait time; wherein the user equipment is configured during the wait time to receive paging requests from the network; and is configured to respond to at least some of the paging requests, the user equipment being configured to select the at least some of the paging requests
(Continued)

to respond to in dependence upon paging information received from the network.

11 Claims, 5 Drawing Sheets

(51) Int. Cl.
  *H04W 76/27* (2018.01)
  *H04W 68/00* (2009.01)
  *H04H 20/38* (2008.01)
  *H04W 68/02* (2009.01)
  *H04W 76/10* (2018.01)
  *H04W 88/02* (2009.01)
  *H04W 88/08* (2009.01)
  *H04W 88/12* (2009.01)
(52) U.S. Cl.
  CPC ......... *H04W 68/005* (2013.01); *H04W 68/02* (2013.01); *H04W 76/27* (2018.02); *H04W 76/10* (2018.02); *H04W 88/02* (2013.01); *H04W 88/08* (2013.01); *H04W 88/12* (2013.01)

(56) References Cited

U.S. PATENT DOCUMENTS

| | | | | |
|---|---|---|---|---|
| 9,706,570 | B2 * | 7/2017 | Kubota | H04W 36/14 |
| 9,769,720 | B2 * | 9/2017 | Malkamaki | H04W 48/20 |
| 2004/0166860 | A1 * | 8/2004 | Neufeld | H04W 36/30 |
| | | | | 455/437 |
| 2006/0040681 | A1 * | 2/2006 | Julka | H04W 68/00 |
| | | | | 455/458 |
| 2007/0238454 | A1 * | 10/2007 | Chambers | H04W 68/00 |
| | | | | 455/422.1 |
| 2008/0182571 | A1 | 7/2008 | Patrick et al. | |
| 2010/0080171 | A1 * | 4/2010 | Rune | H04J 11/0069 |
| | | | | 370/328 |
| 2010/0203905 | A1 | 8/2010 | Chaubey et al. | |
| 2011/0274040 | A1 | 11/2011 | Pani et al. | |
| 2012/0157033 | A1 | 6/2012 | Ou et al. | |
| 2012/0270574 | A1 * | 10/2012 | Nishida | H04W 68/02 |
| | | | | 455/458 |
| 2012/0281530 | A1 * | 11/2012 | Sambhwani | H04W 28/0284 |
| | | | | 370/230 |
| 2014/0126361 | A1 * | 5/2014 | Tiwari | H04W 76/12 |
| | | | | 370/230 |
| 2015/0365846 | A1 * | 12/2015 | Mattsson | H04W 8/18 |
| | | | | 455/466 |

FOREIGN PATENT DOCUMENTS

| | | |
|---|---|---|
| JP | 2001-086553 | 3/2001 |
| JP | 2011-228805 | 11/2011 |
| WO | 2012/064775 | 5/2012 |
| WO | 2012/137296 | 10/2012 |

OTHER PUBLICATIONS

Alcatel-Lucent, "Wait time value extension,", 3$^{rd}$ Generation Partnership Project (3GPP), 3GPP TSG-RAN WG RAN2#84, R2-134254, pp. 1-3, XP050736996, San Francisco, Nov. 11-15, 2013.
"3$^{rd}$ Generation Partnership Project; Technical Specification Group Radio Access Network; Study of Further EUL Enhancements; (Release 12)," 3GPP TR 25.700 V0.5.0, pp. 1-40, XP002725143, (Oct. 2013).
Research in Motion UK Limited, "Abnormal cases when Extended Wait Time is received," 3$^{rd}$ Generation Partnership Project (3GPP), 3GPP TSG-CT WG1 Meeting #77, C1-121247, 11 pages, XP050587490, Taipei, Taiwan, Apr. 16-20, 2012.
International Search Report for PCT/EP2014/002634 dated Nov. 3, 2014.

* cited by examiner

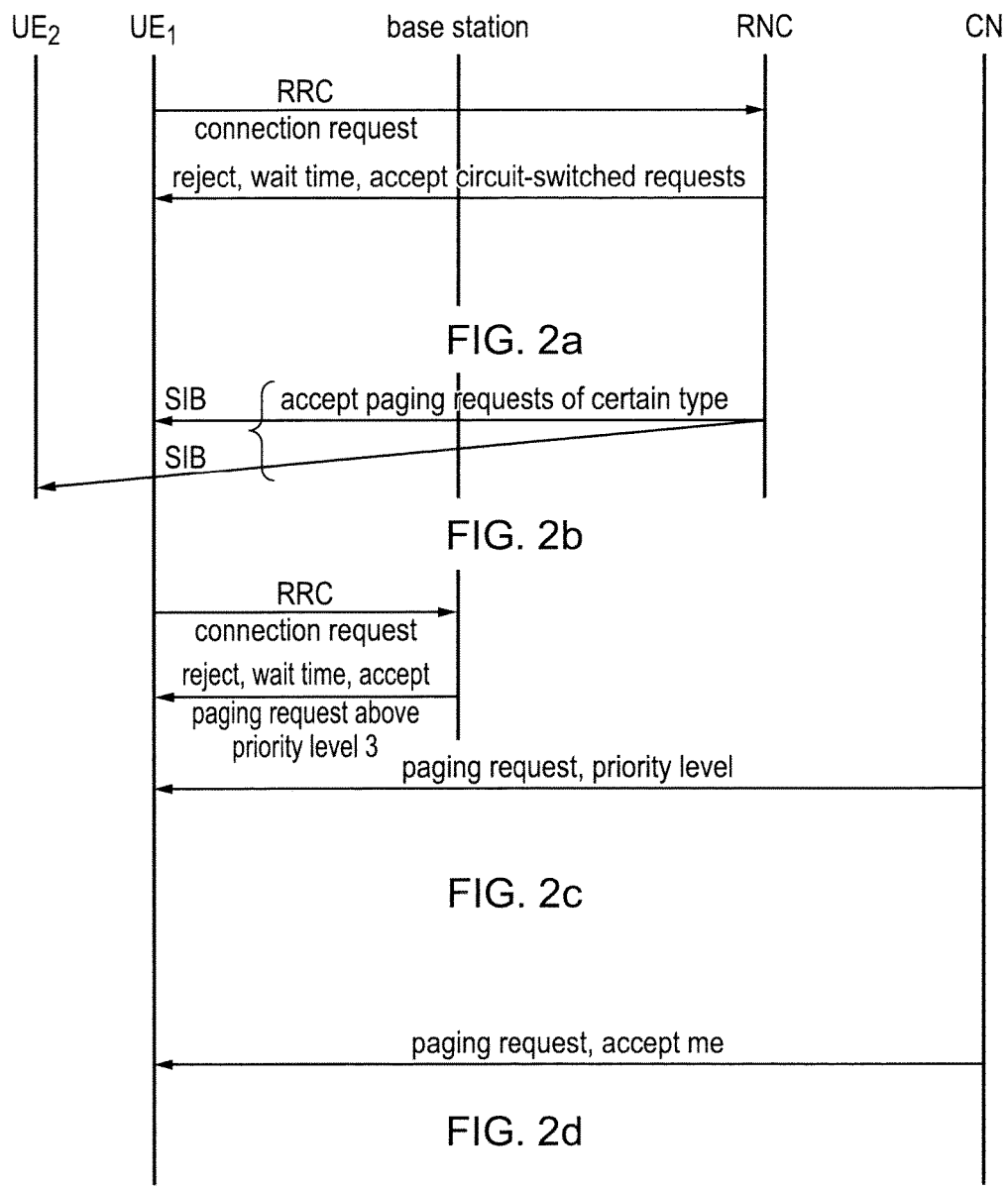

RESPONDING TO PAGING REQUESTS WHILE WAITING TO REQUEST A CONNECTION TO A WIRELESS NETWORK

FIELD OF THE INVENTION

The present invention relates to a method for controlling how user equipment responds to paging requests while in a wait for connection state and the user equipment, network control node base station and computer program product operable to perform that method.

BACKGROUND

Wireless communication networks are known. In a cellular system, radio coverage is provided to user equipment, for example, mobile telephones, by geographical area. Those geographical areas of radio coverage are known as cells. A base station is located in each geographical area to provide the required radio coverage. A base station may support more than one cell providing coverage in the same geographical area. User equipment in the area served by a base station receives information and data from that base station and transmits information and data to that base station.

Information and data transmitted by a base station to user equipment occurs on channels of radio carriers known as downlink carriers. Information and data transmitted by user equipment to a base station occurs on uplink channels of radio carriers known as uplink carriers.

In wireless communication networks user equipment can move between geographical base station coverage areas. Active services provided to user equipment are typically overseen by a radio network controller (RNC). The RNC communicates with user equipment and base stations and determines which base station each user equipment is to be primarily connected to. Furthermore, the RNC acts to control and communicate with base stations and user equipment when user equipment moves from a geographical area served by one base station to a geographical area served by another base station or between cells or sectors served by the same base station. RNC management of cell loading occurs when the user equipment is operating in a connected radio resource control (RRC) state.

User equipment may operate in various modes in, for example, a UMTS communications network. On initial turning on of user equipment within a cell it will typically operate in an idle mode. Once it synchronises and attaches itself to a base station it gains radio resource control (RRC) connection and may be referred to, in some of those RRC states as being in connected mode. Mobile terminals in wireless networks predominantly have two modes of operation as outlined above; that is to say, connected mode or unconnected mode also known as "idle mode".

In order to transition from idle to connected mode, a user equipment will normally gain access to the network via the RRC connection establishment procedure, which is initiated by the user equipment (UE) sending an RRC Connection Request message to an RNC/eNode B (base station that is connected to the mobile network and communicates directly with the user equipment) respectively. Typically the RNC/eNode B will respond to confirm the establishment of an RRC connection between the RNC/eNode B and the UE. However there are circumstances whereby the network (RNC/eNode B) can reject the RRC Connection Request from the UE. As part of the rejection the network is able to provide a "wait time" to the UE, which defines the time period the UE has to wait before repeating the rejected procedure. One consequence of the network rejecting a RRC Connection Request and providing a wait time is that whilst the wait time is running in the UE (which can be up to 15 seconds) the UE doesn't respond to any paging requests.

In addition, in UMTS the RNC can also provide a wait time when responding to a Cell Update procedure from a UE.

For delay tolerant access (which is intended for low priority accesses, typically MTC Machine type communication devices such as Smart Meters) the 3GPP RAN2 standards working group has also defined an extended wait time IE (of up to 30 minutes). Whilst this extended wait time is running in the UE, this 'wait' is only applicable for delay tolerant calls and therefore the UE can respond to any received paging requests and the timer is stopped.

Therefore there is an inconsistency between how a UE reacts to receiving an RRC message containing a wait time and one with an extended wait time, which can lead to problems.

It would be desirable for UEs in a wait or extended wait period to respond to paging requests in a similar way. In particular, it would be advantageous if lower priority devices in an extended wait time were not more reactive to certain paging requests than higher priority devices that have shorter wait times.

SUMMARY

According to a first aspect, there is provided user equipment configured to communicate with other devices across a wireless communication network comprising a plurality of radio coverage cells, said user equipment being configured to respond to receipt of a message from said network, said message comprising a wait time, to not transmit a connection request until after expiry of said wait time; wherein said user equipment is configured during said wait time to receive paging requests from said network; and is configured to respond to at least some of said paging requests, said user equipment being configured to select said at least some of said paging requests to respond to in dependence upon paging information received from said network.

The present invention recognises that user equipment being configured not to respond to paging requests during a wait time irrespective of the priority of the request or the current loading of the network can be disadvantageous. It addresses this by allowing at least some paging requests to be responded to, in dependence upon paging information that is received from the network. This allows the network to have some control of whether or not a paging request is responded to and stops the blanket ignoring of such requests that occurred previously. The at least some requests may comprise all the paging requests where the network paging information deems this appropriate, alternatively it may be a particular subset of requests. It should be noted that the wait time may be a conventional wait time of several seconds, or it may be an extended wait time of several minutes.

In some embodiments, the paging information comprises an indication of types of paging requests that must be responded to, the user equipment being configured during the wait time to respond to the types of paging requests that must be responded to.

The paging information may comprise an indication of the types of paging request that must be responded to. In this regard, there may be a number of different types of paging requests, for example there may be paging requests of different types depending on the nature of the signal generating them, for example there may be paging requests for terminating conversational calls, for terminating streaming calls, for terminating interactive calls, for terminating background calls, for terminating high priority signalling, for terminating low priority signalling and for a terminating cause unknown. The priority of such paging requests will depend on their type (that is on the nature of the signal that generated them) and, thus, providing an indication of the type of paging request that must be responded to within the paging information allows the user equipment to respond to particular types and not to other types. In other cases, the indication of type of the paging request will be an indication of its priority and the user equipment will be configured to respond to paging requests above a certain priority.

Thus, when the loading on the network is particularly high the user equipment may be configured to only respond to very high priority requests, while at other times it may be configured to respond to lower priority requests. The type of paging requests may also be grouped into the nature of the signal that the paging request is for; for example, whether it is for a circuit-switched signal or a packet-switched signal.

In some embodiments, said user equipment is configured to ignore at least some others of said paging requests in dependence upon said paging information received from said network.

Although in some cases it is all of the paging requests that the paging information indicates should be responded to, in other embodiments it is only a subset of them and the other requests are ignored.

In some embodiments, the paging information is received as part of a system information broadcast.

The paging information may be received as part of a system information broadcast which can be transmitted to all of the user equipment within a particular area and includes information such as codes, channels, etc. of the system. This system information may also include the paging information which can inform all of the user equipment within the area which paging requests should be responded to during a wait time and which can be ignored. This system information broadcast may be sent out in response to a certain loading of the system such that when the loading falls below a certain level more paging requests can be responded to than when it is above a certain level.

In some embodiments, the message comprising said wait time further comprises said paging information.

Alternatively, the message that comprised the wait time might also comprise the paging information indicating which paging requests should be responded to during that wait time. As this paging information is relevant to the wait time, it may be convenient to send this information along with the message that sent the wait time. This message may be a connection rejection or it may be a release signal from the network, for example.

In some embodiments, the paging information comprises a priority indicator associated with the paging request and indicating to the user equipment whether the paging request must be responded to or must be ignored, the user equipment being configured during the wait time to respond to receipt of the paging request with the priority indicator indicating the paging request must be responded to, to respond to the paging request.

Alternatively, the paging information may be associated with the paging request itself, such that the paging request comprises an indicator indicating that that particular paging request should be responded to. This is a convenient way of transmitting the paging request and allows the response to or not of paging requests to be specific to those paging requests as opposed to the user equipment itself.

In some embodiments, said user equipment comprises a timer configured to indicate to said user equipment when the wait time has expired, the user equipment being configured when responding to the at least some paging requests to not reset the timer such that the timer is either paused or continues to time the wait time. In this regard when the timer is paused it will be restarted and continue to run from the paused point once the page has been responded to.

It may be advantageous when responding to paging requests during the wait time not to reset the timer such that the timer is paused during the response or continues to time. In this way, when the paging request has been responded to, the user equipment is still within the waiting time if the waiting time has not expired during this period and the user equipment is not able to send a connection request any earlier than would be the case had it not received the paging request. This alleviates the problem of some prior art devices where, when responding to paging requests, the timer is reset and user equipment can send a connection request without waiting for the expiry of the wait time.

In some cases, the user equipment may be configured to respond to all paging requests during the wait time and in such cases it may be advantageous if the timer is not reset when the user equipment is responding but, rather, is paused and then restarted or continues to time such that the user equipment is not able to transmit a connection request any earlier than had it not received the paging request. In this way, the loading on the network is not increased inadvertently.

A second aspect of the present invention provides a network control node operable to control load across a wireless communication network comprising a plurality of radio coverage cells, the network control node comprising: load determination logic operable to determine loading of at least one of said radio coverage cells based on an indication of an operating parameter of said at least one radio coverage cells; request receiver for receiving connection requests from user equipment via said at least one of said radio coverage cells; communication logic operable to transmit a message in response to said load determination logic determining said loading of said at least one of said radio coverage cells being above a predetermined level, said message comprising a wait time indicating a time during which said user equipment should not transmit a request to connect to said network; and operable to transmit paging information indicating at least some paging requests that said user equipment should respond to during said wait time.

A network control node which may, for example, be a radio network controller (RNC) or a base station (eNodeB) can provide paging information to user equipment, the paging information indicating at least some paging requests that the user equipment should respond to during the wait time. In this regard, the network control node will transmit a message that includes the wait time indicating a time during which the user equipment should not transmit a request to connect to the network, and it may also transmit information indicating which paging requests the user equipment should respond to during this wait time. In this way, a system in which certain paging requests can be responded to during the wait time can be provided. The system is dynamic in that the network control node can transmit different paging information depending, for example, on the loading of the network or on other factors.

In some embodiments the communication logic is configured to determine the at least some paging requests that the user equipment should respond to in dependence upon a current loading of the at least one of the radio coverage cells determined by the load determination logic.

Although the communication logic within the network control node can determine the paging request that the user equipment should respond to in a number of different ways, in some cases the current loading of the at least one of the radio coverage cells is a factor that affects which paging requests should be responded to. In this regard, where the system is very highly loaded then it may be that paging requests should in general be ignored unless they are of a particularly high priority, whilst in other cases where the system is not so loaded it may be that more paging requests can be responded to without affecting the system unduly.

In some embodiments the communication logic is further operable to transmit a system information broadcast, the system information broadcast comprising the paging information indicating the at least some paging requests that the user equipment should respond to during the wait time.

The network control node may transmit system information broadcasts from time to time, these system information broadcasts containing information about the system such as available channels and any codes required. These system information broadcasts are sent to all user equipment within range and they may include paging information which indicates which paging requests that a user equipment that is currently in a wait mode should respond to. By using a system information broadcast to send said paging information, all user equipment receiving this system information broadcast will receive said paging information and if the sort of paging requests that should currently be responded to are based on, for example, the current loading of that portion of the network, then it may well be appropriate that all the user equipment that are receiving signals within that portion are sent the same paging information.

In some embodiments, the communication logic is operable to transmit the paging information in the message comprising the wait time.

Alternatively, the paging information can be sent in the message that contains the wait time. This paging information is only relevant to user equipment that are currently waiting and, thus, it is appropriate to send this information with the wait time, as it is at this point that user equipment will require the information.

A third aspect of the present invention provides a network control node operable to control load across a wireless communication network comprising a plurality of radio coverage cells, the network control node comprising: paging generation logic operable to generate paging requests directed to a user equipment, the paging generation logic being configured to apply a priority flag to the paging request, the priority flag being indicative of whether the user equipment should respond to the paging request during a wait time, when the user equipment is waiting to transmit a connection request.

In some cases, the network control node may add a priority flag to the paging request, the priority flag acting as the paging information in that it is indicative of whether the user equipment should respond to a paging request during a wait time. Once again, this is a convenient way of sending the information, as clearly it is only when the user equipment has received a paging request that it requires knowledge of whether or not it should respond to it. In this case, the network control node may be the base station, it may be the RNC, or it may be the core network.

A fourth aspect of the present invention provides a method of selectively responding to paging requests at a user equipment during a wait time, the wait time arising in response to the user equipment having received a message comprising the wait time from a wireless communication network comprising a plurality of radio coverage cells, the wait time indicating a time during which the user equipment should not transmit a connection request; the method comprising the steps of: during the wait time receiving at least one paging request from the network; and responding to the paging request in dependence upon paging information received from the network.

A fifth aspect of the present invention provides a method of controlling load across a wireless communication network comprising a plurality of radio coverage cells, comprising: determining loading of at least one of the radio coverage cells; receiving connection requests from user equipment via the at least one of the radio coverage cells; transmitting a message in response to determining the loading of the at least one of the radio coverage cells being above a predetermined level, the message comprising a wait time indicating a time during which the user equipment should not transmit a connection request; and transmitting paging information indicating at least some paging requests that the user equipment should respond to during the wait time.

A sixth aspect of the present invention provides a method of generating paging requests in a wireless communication network comprising a plurality of radio coverage cells, the method comprising: generating paging requests directed to a user equipment, the paging requests comprising a priority indicator indicating whether the user equipment should respond to the paging request during a wait time in which the user equipment has had a connection request rejected and is waiting to transmit a new request.

A seventh aspect of the present invention provides a computer program product comprising a computer program which when executed by a computer controls said computer to perform steps in a method according to any one of the fourth to sixth aspects of the present invention.

BRIEF DESCRIPTION OF THE DRAWINGS

Embodiments of the present invention will now be described further, with reference to the accompanying drawings, in which:

FIGS. 2A to 2D schematically show user equipment communicating across a wireless communication network and the signals that they transmit and receive;

DESCRIPTION OF THE EMBODIMENTS

Overview

Figure 1A:
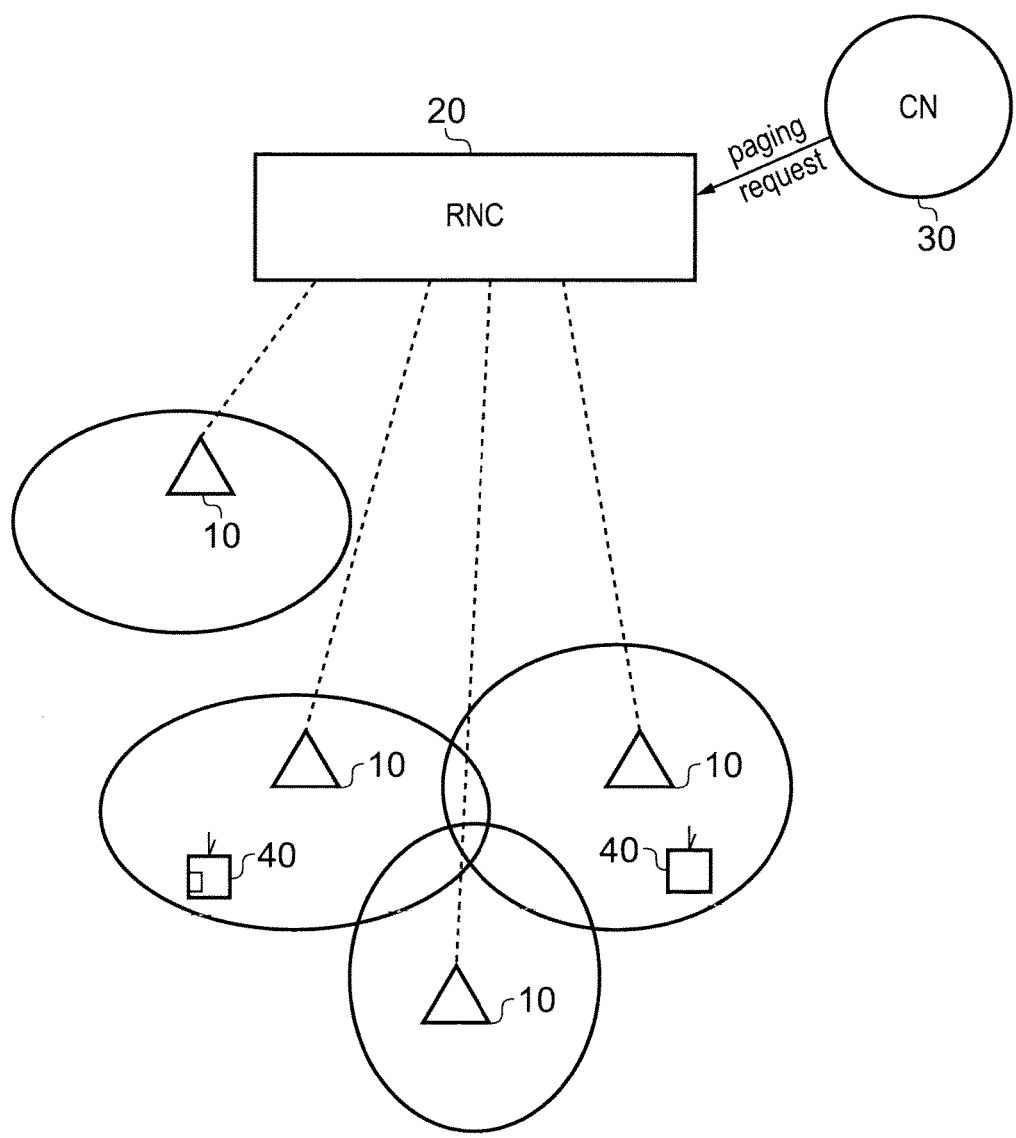
FIG. 1A and 1B show wireless communication networks with radio controlled nodes serving user equipment according to embodiments of the present invention.

Before discussing the embodiments in any more detail, first an overview will be provided.

As noted in the background section, there are problems associated with how different user equipment react to paging requests during a wait and an extended wait time.

One problem identified by the inventors can be shown in the following example

UE1 is assigned a wait time of 15 s

UE2 is assigned an extended wait time of 30 minutes

CN (core network) paging is sent to both UE1 & UE 2 for terminating voice calls 10 s after UE1 & UE2 have had RRC Connection Requests rejected, i.e. 10 s after the start of the relevant timers. Hence the UE in the extended wait time period will react to paging from the Core Network but a UE in the wait time period will ignore the CN paging. This example demonstrates that a technical problem arises in that a UE in wait time is not as effective (regarding responding to paging) as a UE in the extended wait time. In this example the paging has been initiated for a terminating voice call, which is considered as a high priority service, so the normal expectation would be that a UE would react and attempt to respond to any such paging.

Further, the Wireless Priority Service (WPS) requires terminating UEs to consider incoming calls as high priority calls and to respond to an associated paging message.

In UMTS & LTE, WPS calls will use the high priority signalling terminating call type. In LTE the paging message sent over the S1 interface indicates the priority of said paging message. It allows an eNB (eNodeB) to selectively send only high priority paging messages to the UE. The wait timer which is primarily meant for normal priority calls should not prevent a UE responding to these high priority paging messages.

A further issue is that the current behaviour for a UE running an extended wait time is that the UE will respond to paging and at the same time the UE will stop running the extended wait time timer when it responds to the paging request, and the UE will not restart it after responding to the page. This allows the UE to initiate a delay tolerant call, which is unwanted behaviour, as this could give rise to additional signalling and loading in the network, which the network was trying to prevent when it rejected the RRC procedure from the UE in the first place.

The inventors of the present technique recognised that when a wireless communication network is fairly heavily loaded such that it may reject connection requests or may release connections from previously connected devices, it may still be able to handle paging requests and, given that some of these are of a high priority, it may be advantageous to allow it to do so in particular circumstances.

The present technique therefore provides a system where whether or not a paging request is handled can be determined from information sent from the network. In this regard, the information may change as the loading of the network changes and the information may contain paging specific information such that certain types of requests or certain high priority requests will be responded to, whilst lower priority requests can be ignored.

Embodiments of the invention also address the problem of devices in a wait time responding to requests and, in so doing, exiting the wait time such that connection requests may be sent to the system before the expiry of that wait time. Thus, embodiments of the invention allow user equipment to respond to paging requests while continuing to run the timer or while pausing the timer, such that the wait time does not expire early simply because the user equipment responds to a paging request.

In some cases, the paging information that indicates which paging requests should be responded to can be sent along with a message that sends the wait time, such that on receipt of the wait time the user equipment will also receive information indicating which paging request should be responded to during this wait time. Alternatively, the paging information may be sent as a system information broadcast that is broadcast to all user equipment within range of the signal. This may be appropriate where whether or not a certain type of paging request is responded to is dependent upon the loading of a particular portion of the network and, thus, transmitting a broadcast signal to all user equipment within that portion is a convenient way of indicating to them which paging request should be responded to during a wait time.

In alternative embodiments, the paging request itself may be amended to include an indicator or flag that indicates to the user equipment that that particular paging request should be responded to.

Figure 1B:
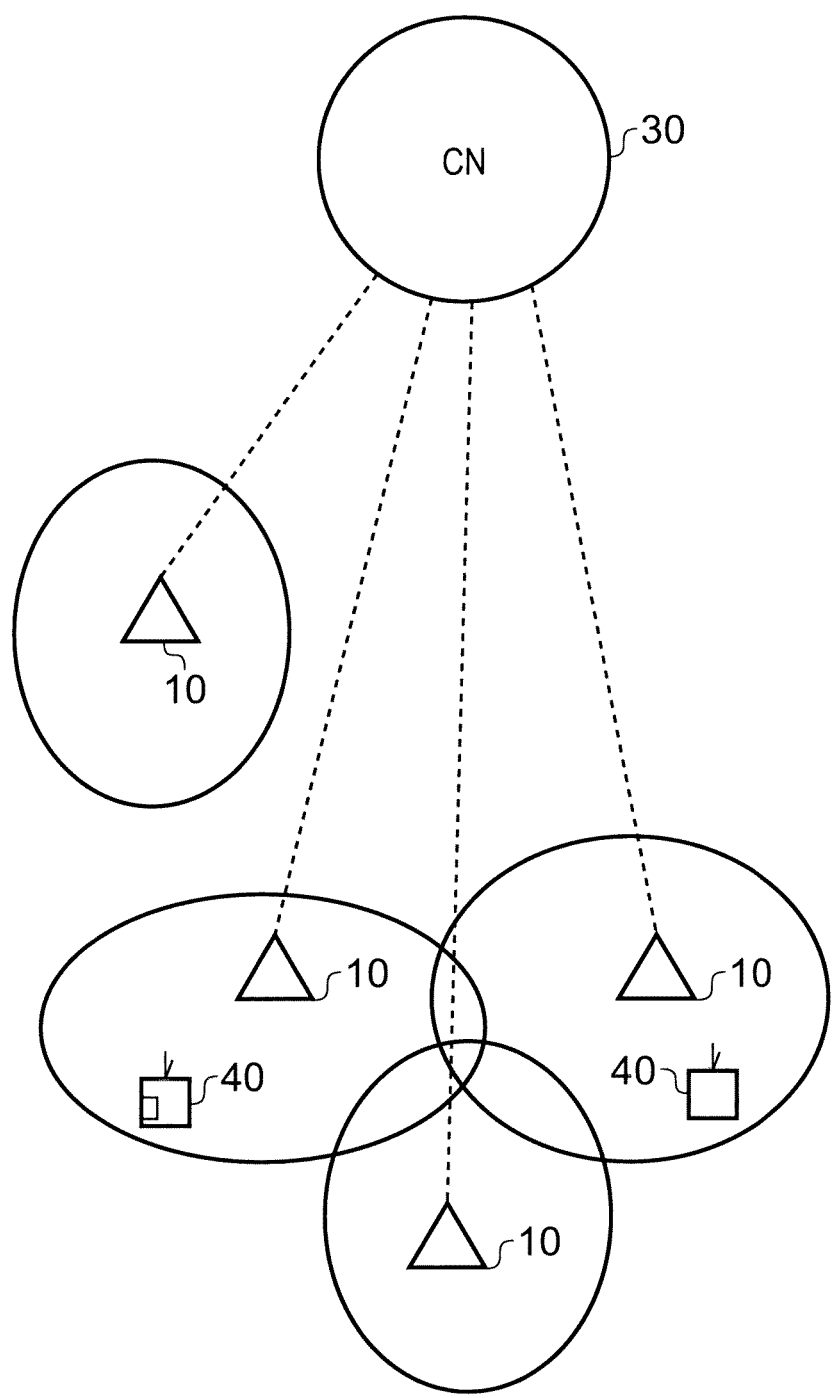

FIG. 1A illustrates a wireless communication network which comprises a plurality of base stations or base transceiver stations or Node Bs 10 that are overseen by a radio network controller (RNC) 20 which itself communicates with a core network 30 which provides a path for the exchange of information between different sub-networks. FIG. 1B shows an alternative example of a wireless communication network which comprises a plurality of base stations or base transceiver stations or eNodeBs 10 that are overseen in this case directly by the core network 30.

In these networks individual user equipment such as mobile phones or smart meters 40 will connect with each other via the base stations and in the case of FIG. 1A the radio network control system 20 and possibly the core network 30. Radio network control system 20 in FIG. 1A will control the loading of the network and, thus, requests for connection to a network will be controlled by the RNC 20 which will determine if the current loading merits a connection or whether the connection request should be rejected. If the current connection request is rejected then a wait time may be sent along with the rejection message which will indicate the time during which the user equipment should not send a further connection request. In this regard, the wait time might be a relatively short wait time of, say, 10 seconds, or it may be an extended wait time of several minutes, this may be the case where the user device is a low priority device such as a smart meter. In the case of the wireless network shown in FIG. 1B such rejections are sent by the base stations themselves When devices are in a wait time, although they cannot transmit information to the network they can still receive information from the network and they may receive paging requests, that is requests from other devices for connection to that device. The request may, for example, be for a terminating conversational call request and, if the request is a high priority request, it may be advantageous if the device is allowed to respond to it even if its earlier connection request to the network was refused.

Thus, embodiments of the present invention provide the ability for the network to supply information to the user equipment indicating which paging requests should currently be responded to and which can be ignored during a wait time. In this way, the system can be configured according to the priority of the paging request and the current loading of particular portions of the network, to either ignore or respond to a paging request.

Some examples of the signals that the user equipment may send across the network and the responses and other signals that user equipment will receive are shown in FIG. 2. In FIG. 2a, user equipment $UE_1$ sends a connection request via a base station to the radio network controller which controls connections of the user devices in dependence upon current loading. In this case, the system is quite heavily loaded and the request is a low priority request and, thus, the RNC rejects the request and sends a wait time during which a further request should not be sent. It also sends information regarding which paging requests can be responded to during this wait time. In this case, it indicates that any paging request that is for a circuit-switched signal should be responded to, while other paging requests for packet-switched signals should be ignored. In this regard, in some systems circuit-switched communication is used, for example, for voice calls, while packet-switched communication may be used for other communications. In other systems, all communications may be by packet-switched messages in which case, clearly, priority will not be given on this basis.

FIG. 2b shows an alternative embodiment where a radio network controller broadcasts system information in a system information broadcast (SIB) which indicates various information for the system and in this embodiment also indicates the type of paging requests that should currently be accepted by user equipment in a wait time. Thus, such a system information broadcast will be sent out from appropriate base stations indicated by the RNC to all user equipment within their range and, thus, all user equipment within that particular area will respond to the type of paging request indicated by the system information broadcast. In this regard, the type of paging request may be a paging request for terminating an interactive call, or it may be a paging request for terminating a streaming call or a conversational call. It may, of course, be a paging request for any message that the system determines should be responded to currently.

FIG. 2c shows an alternative embodiment where there is a plurality of base stations and a mobility management entity (MME) which in this embodiment controls the allocation of resources to the user equipment communicating via the base stations. A connection request is received and is rejected by the basestation, and a wait time is provided along with an indication that paging requests with a priority level above a certain priority level should be accepted. In this embodiment, paging requests are provided with a priority indication indicating their priority and, thus, a convenient way of determining which should be responded to during a wait time and which can be ignored is to provide an indication of the priority level with the rejection request, such that paging requests of a higher priority level will be accepted whilst those of that priority level or lower can be ignored until after the wait time.

FIG. 2c shows an example of a network such as that shown in FIG. 1B. Here a connection request has been sent to a basestation and rejection with a wait time has been received. A paging request is received at the user equipment which has a priority level indicator associated with it. The user equipment is currently in the wait time and has information with the rejection indicating which priority level paging requests should be responded to. It will therefore respond or ignore the request in dependence upon the priority level of that particular received paging request.

In an alternative embodiment shown in FIG. 2d, a paging request may itself have an indicator associated with it which indicates whether or not it should be accepted. In this regard, it may have a simple "I must be accepted" flag and all user equipment in wait time that receives such a priority request will respond to it.

Figure 3:
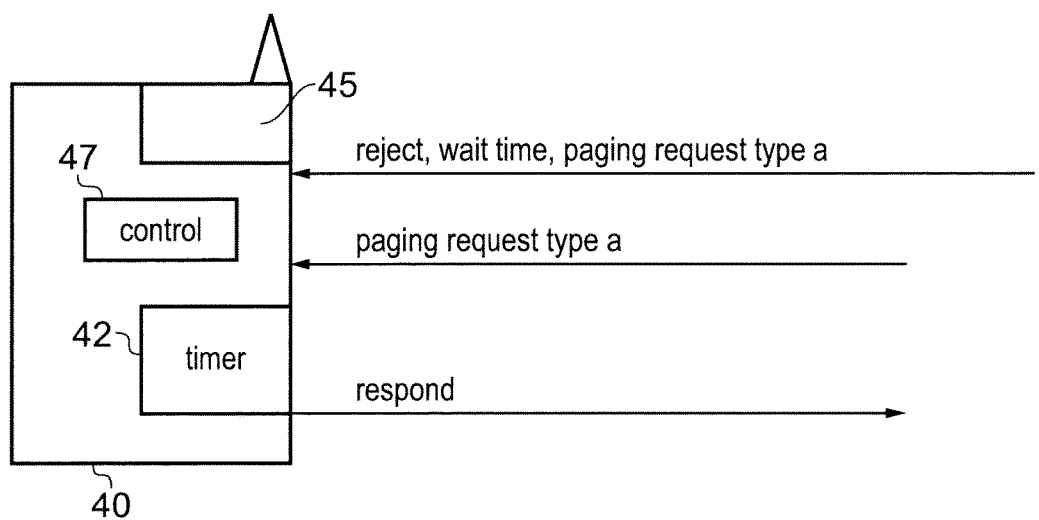
FIG. 3 schematically shows user equipment during a wait time receiving a paging request.

FIG. 3 shows user equipment 40 with communication logic 45 for transmitting and receiving signals and control logic 47 for controlling the transmission and reception of signals. There is also timer 42 that is used for timing a wait time.

In the example shown user equipment 40 receives a reject connection request from the network and along with this reject request it receives a wait time during which it must not request a connection to the network and an indication that paging requests of type a should be responded to while other paging requests can be ignored during the wait time.

In response to this reject request, user equipment 40 will set timer 42 to the wait time and start the timer. While the timer is still running, that is before the expiry of the wait time a paging request is received and this paging request is of type a. The user equipment therefore responds to this paging request and continues to run the wait timer, such that the wait time will expire at the same time as it would have expired at had no response been sent.

Figure 4:
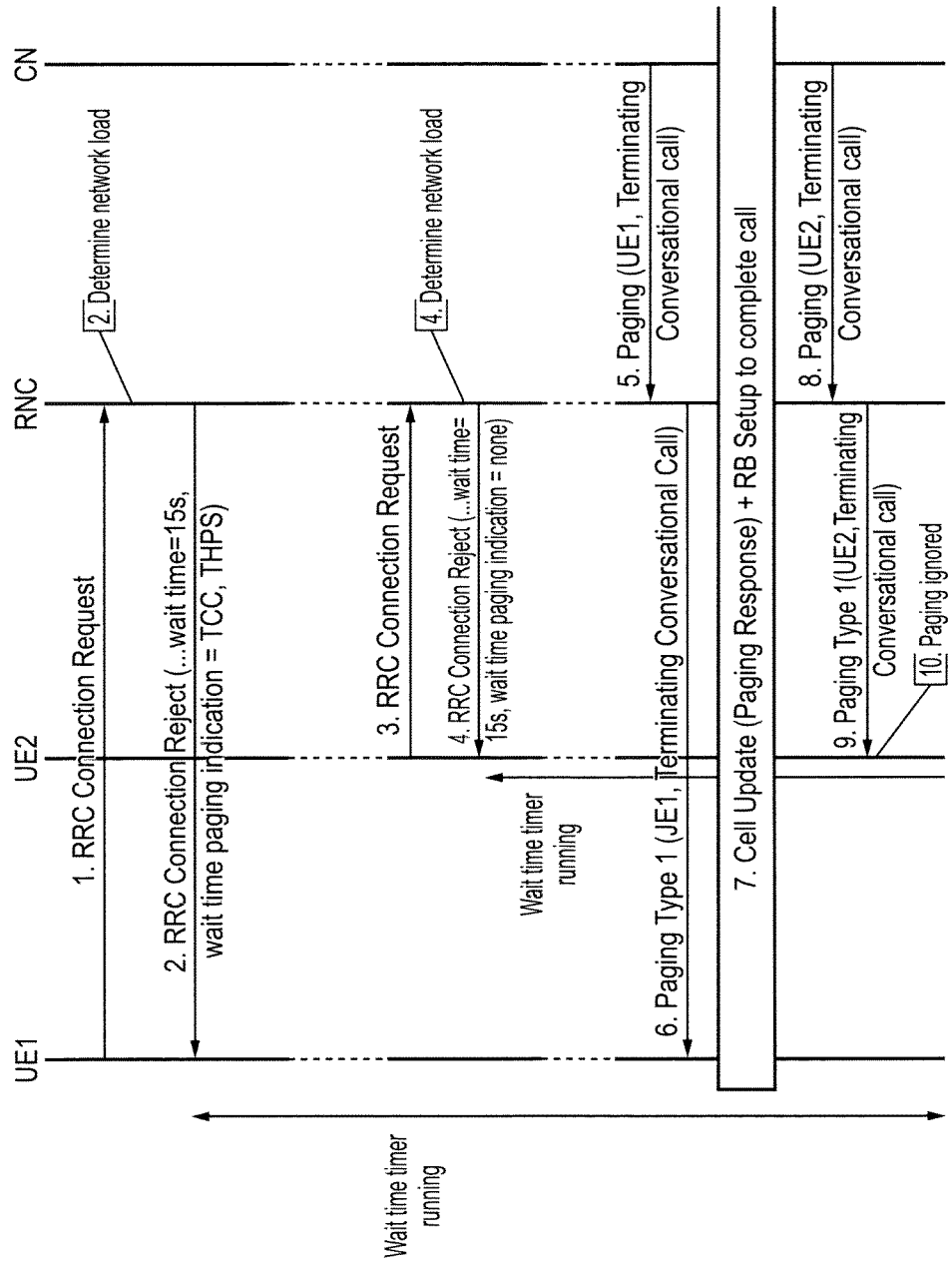
FIG. 4 schematically shows two user equipment communicating with control nodes in a wireless communication network.

FIG. 4 shows signals that are sent to and from two user equipment UE1 & UE2 that are roaming through a UMTS network.

The following steps occur and the following signals are sent:
1) The UE detects a Node B supported by the RNC and initiates an RRC Connection Request to the RNC
2) The RNC determines that the network is overloaded and rejects the RRC Connection Request by sending an RRC Connection Reject with a wait time set to 15 s. Because the network load is below a "critical overload threshold" the RNC provides additional information in the Reject message that indicates to the UE that it can respond to a paging request for Terminating Conversational Calls and Terminating High Priority Signalling.
3) A few seconds later another UE, UE2, initiates an RRC Connection Request to the same RNC.
4) At this time the network load has risen such that it is over the specific "critical overload threshold", the RNC thus rejects the Connection Request with a wait time of 15 s, and an indication that the UE should ignore all paging requests whilst running the wait time.
5) Subsequently the CN initiates a Page for UE1 due to a terminating conversational voice call.
6) The RNC pages UE1 using the relevant cause value
7) Since UE1 has previously been provided with an indication of how it should react to paging messages received when its wait time timer is running, it determines that it can respond to this type of page and hence it initiates a Cell Update in response to the paging and the call is established.
8) The CN then initiates a Page for UE2 also due to a terminating conversational voice call
9) The RNC pages UE2 using the relevant cause value
10) However UE2 does not respond as it had previously been configured to ignore paging requests when running a wait time timer.

Thus, as can be seen UE1 and UE2 react in different ways to the paging requests in dependence upon the paging information that was sent to them along with the wait time in the RRC rejection of the connection request.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A user equipment, including a processor, configured to communicate with other devices across a wireless communication network comprising a plurality of radio coverage cells, said processor being configured to respond to receipt of a message from said network, said message comprising a wait time, to not transmit a connection request until after expiry of said wait time;
   wherein said processor is configured to, during said wait time, receive paging requests from said network; and is configured to respond to at least some of said paging requests, said processor being configured to select said at least some of said paging requests to respond to in dependence upon paging information received from said network; and
   wherein said paging information comprises an indication of types of paging requests that must be responded to, said processor being configured to, during said wait time, respond to said types of paging requests that must be responded to.

2. The user equipment according to claim 1, said user equipment comprising a timer configured to indicate to said user equipment when said wait time has expired, said processor being configured when responding to said at least some paging requests to not reset said timer such that said timer is either paused or continues to time said wait time.

3. The user equipment according to claim 1, wherein said processor is configured to respond to at least some of said paging requests while continuing to run a wait time timer.

4. The user equipment according to claim 1, said user equipment being a machine type communication device and said wait time being an extended wait time of several minutes.

5. A user equipment, including a processor, configured to communicate with other devices across a wireless communication network comprising a plurality of radio coverage cells, said processor being configured to respond to receipt of a message from said network, said message comprising a wait time, to not transmit a connection request until after expiry of said wait time;
   wherein said processor is configured to, during said wait time, receive paging requests from said network; and is configured to respond to at least some of said paging requests, said processor being configured to select said at least some of said paging requests to respond to in dependence upon paging information received from said network; and
   wherein said paging information is received as
      a signal associated with said paging request indicating that said paging request must be responded to.

6. A network control node operable to control load across a wireless communication network comprising a plurality of radio coverage cells, said network control node comprising a processor configured to:
   determine loading of at least one of said radio coverage cells based on an indication of an operating parameter of said at least one radio coverage cells;
   receive connection requests from user equipment via said at least one of said radio coverage cells;
   transmit a message in response to said processor determining said loading of said at least one of said radio coverage cells being above a predetermined level, said message comprising a wait time indicating a time during which said user equipment should not transmit a request to connect to said network;
   transmit paging information indicating at least some paging requests that said user equipment should respond to during said wait time; and
   determine said at least some paging requests that said user equipment should respond to in dependence upon a current loading of said at least one of said radio coverage cells determined by said processor.

7. The network control node according to claim 6, wherein the processor is further configured to transmit said paging information in said message comprising said wait time.

8. A network control node operable to control load across a wireless communication network comprising a plurality of radio coverage cells, said network control node comprising a processor configured to:
   determine loading of at least one of said radio coverage cells based on an indication of an operating parameter of said at least one radio coverage cells;

receive connection requests from user equipment via said at least one of said radio coverage cells;

transmit a message in response to said processor determining said loading of said at least one of said radio coverage cells being above a predetermined level, said message comprising a wait time indicating a time during which said user equipment should not transmit a request to connect to said network;

transmit paging information indicating at least some paging requests that said user equipment should respond to during said wait time; and transmit a system information broadcast, said system information broadcast comprising said paging information indicating said at least some paging requests that said user equipment should respond to during said wait time.

9. A method of selectively responding to paging requests at a user equipment during a wait time, said wait time arising in response to said user equipment having received a message comprising said wait time from a wireless communication network comprising a plurality of radio coverage cells, said wait time indicating a time during which said user equipment should not transmit a connection request; the method comprising:

during said wait time, receiving at least one paging request from said network; and responding to said paging request in dependence upon paging information received from said network;

wherein said paging information is received as a signal associated with said paging request indicating that said paging request must be responded to.

10. A non-transitory computer-readable medium comprising a computer program which, when executed by a computer, control said computer to perform the method according to claim 9.

11. A method of controlling load across a wireless communication network comprising a plurality of radio coverage cells, comprising:

determining loading of at least one of said radio coverage cells;

receiving connection requests from user equipment via said at least one of said radio coverage cells;

transmitting a message in response to determining said loading of said at least one of said radio coverage cells being above a predetermined level, said message comprising a wait time indicating a time during which said user equipment should not transmit a connection request;

transmitting paging information indicating at least some paging requests that said user equipment should respond to during said wait time; and transmitting a system information broadcast, said system information broadcast comprising said paging information indicating said at least some paging requests that said user equipment should respond to during said wait time.

* * * * *